(12) United States Patent
Lorenc et al.

(10) Patent No.: US 9,097,462 B2
(45) Date of Patent: Aug. 4, 2015

(54) HOME LAUNDRY DRIER

(75) Inventors: Marcin Lorenc, Sacile (IT); Paolo Ros, Fiume Veneto (IT)

(73) Assignee: Electrolux Home Products Corporation N.V., Brussels (BE)

( * ) Notice: Subject to any disclaimer, the term of this patent is extended or adjusted under 35 U.S.C. 154(b) by 171 days.

(21) Appl. No.: 13/984,421

(22) PCT Filed: Feb. 2, 2012

(86) PCT No.: PCT/EP2012/051780
§ 371 (c)(1), (2), (4) Date: Aug. 8, 2013

(87) PCT Pub. No.: WO2012/107347
PCT Pub. Date: Aug. 16, 2012

(65) Prior Publication Data
US 2013/0312276 A1 Nov. 28, 2013

(30) Foreign Application Priority Data
Feb. 10, 2011 (EP) .................................... 11154057

(51) Int. Cl.
*D06F 58/20* (2006.01)
*F26B 21/08* (2006.01)
(Continued)

(52) U.S. Cl.
CPC .............. *F26B 21/086* (2013.01); *D06F 58/08* (2013.01); *D06F 58/20* (2013.01); *D06F 58/206* (2013.01);
(Continued)

(58) Field of Classification Search
CPC .............. F26B 3/00; F26B 3/02; D06F 58/00; D06F 58/02; D06F 35/00; D04H 3/00; D04H 3/02
USPC .......... 34/76, 86, 595, 430, 497, 601; 68/5 C, 68/5 R, 19, 20; 8/149, 159; 62/259.3, 420, 62/421
See application file for complete search history.

(56) References Cited

U.S. PATENT DOCUMENTS 4,621,438 A * 11/1986 Lanciaux .......................... 34/77
5,343,632 A * 9/1994 Dinh ............................... 34/507
(Continued)

FOREIGN PATENT DOCUMENTS

EP 1209277 A2 5/2002
EP 2063011 A1 5/2009
(Continued)

OTHER PUBLICATIONS

International Search Report mailed Jul. 30, 2012 in corresponding International Application No. PCT/EP2011/051780.
(Continued)

*Primary Examiner* — Steve M Gravini
(74) *Attorney, Agent, or Firm* — Banner & Witcoff, LTD.

(57) ABSTRACT

A home laundry drier (1) includes a laundry drum (4) which is located inside a casing (3) to rotate about an longitudinal axis (A), and a closed circuit hot-air generator (7) provided with: an air recirculating conduit (8) connected to laundry drum (4); a centrifugal fan (9) and heat-pump means (10). The heat pump means (10) includes first (12) and second air/refrigerant heat exchangers (13) located in the air recirculating conduit (8) to cool the airflow coming out from the laundry drum, and respectively, to heat the airflow returning back into laundry drum (4). The home laundry drier (1) further includes an electric motor (14) designed to simultaneously rotate both centrifugal fan (9) and the laundry drum (4) through transmission system means (16); and inverter means (23) controlling the electric motor (14) and configured to receive a predetermined speed which is associated to a nominal airflow rate within the air recirculating conduit (8) and to a nominal drum speed. The electric motor (14) is controlled so that the output motor speed is maintained substantially equal to a predetermined speed, independently of decreasing of the airflow rate caused by clogging-up of particles within the first (12) and/or second air/refrigerant heat exchangers (13) of the heat-pump means (10).

20 Claims, 3 Drawing Sheets

(51) Int. Cl.
*D06F 58/28* (2006.01)
*D06F 58/08* (2006.01)

(52) U.S. Cl.
CPC ........ *D06F 58/28* (2013.01); *D06F 2058/2858* (2013.01); *D06F 2058/2864* (2013.01); *D06F 2058/2877* (2013.01); *Y02B 40/72* (2013.01)

(56) References Cited

U.S. PATENT DOCUMENTS

| | | | |
|---|---|---|---|
| 7,191,543 B2* | 3/2007 | Yakumaru et al. | 34/77 |
| 7,921,578 B2* | 4/2011 | McAllister et al. | 34/597 |
| 8,707,581 B2* | 4/2014 | Quaroni et al. | 34/604 |
| 8,844,163 B2* | 9/2014 | Palazzin et al. | 34/603 |
| 2007/0151312 A1* | 7/2007 | Bruce et al. | 68/3 R |
| 2011/0016928 A1* | 1/2011 | Beihoff et al. | 68/19 |
| 2013/0312276 A1* | 11/2013 | Lorenc et al. | 34/76 |
| 2014/0165416 A1* | 6/2014 | Pillot et al. | 34/82 |
| 2015/0033806 A1* | 2/2015 | Cerrato et al. | 68/5 C |
| 2015/0040421 A1* | 2/2015 | Contarini et al. | 34/468 |

FOREIGN PATENT DOCUMENTS

| | | |
|---|---|---|
| EP | 2336419 A1 | 6/2011 |
| EP | 2487290 A1 * | 8/2012 |

OTHER PUBLICATIONS

European Search Report dated Aug. 8, 2011 in corresponding EP Application No. 11154057.1.

* cited by examiner

HOME LAUNDRY DRIER

BACKGROUND

The present invention relates to a home laundry drier.

More specifically, the present invention relates to a rotary-drum home laundry drier comprising: a substantially parallelepiped-shaped outer box casing; a cylindrical bell-shaped drum for housing the laundry to be dried, and which is located in axially rotating manner inside the casing to rotate about its horizontally oriented longitudinal axis, directly facing a laundry loading and unloading opening formed in the front face of the casing; a door hinged to the front face of the casing to rotate to and from a rest position closing the opening in the front face of the casing to seal the casing and the bell-shaped drum.

Further, a rotary-drum laundry drier of the above type comprises a closed-circuit, a hot-air generator designed to circulate inside the revolving drum a stream of hot air with a low moisture content, and which flows through the revolving drum and over the laundry inside the drum to rapidly dry the laundry.

In the rotary-drum laundry drier of the above type, the closed-circuit, hot-air generator comprise an air recirculating conduit having its two ends connected to the revolving drum, on opposite sides of the latter; a centrifugal fan located along the recirculating conduit to produce, inside the latter, an airflow which flows through the revolving drum; and finally a heat-pump device having: a compressing device, which subjects a gaseous refrigerant to compression (e.g. adiabatic compression) so that refrigerant pressure and temperature are much higher at the outlet than at the inlet of compressing device; and two heat exchangers, which are located one after the other, along the air recirculating conduit, and are designed to receive the refrigerant from the compressing device so that to cool or heat the airflow.

In detail, a first air/refrigerant heat exchanger, commonly referred to as the evaporator, provides for rapidly cooling the airflow arriving from the revolving drum to condense the surplus moisture in the airflow; whereas a second air/refrigerant heat exchanger, commonly referred to as the condenser, provides for rapidly heating the airflow arriving from the first heat exchanger and directed back to the revolving drum, so that the airflow re-entering into the revolving drum is heated rapidly to a temperature higher than or equal to that of the air flowing out of the revolving drum.

In the above domestic laundry driers, flowing of the airflow through the revolving drum is accomplished by an electrical motor, i.e. a three-phase induction electric motors that drives both the centrifugal fan and a transmission system that rotates the revolving drum.

Unluckily, despite the fact that there are several removable air-filters located in the air recirculating conduit, during the flowing of the air through the revolving drum, particles of lint/fluff/dust build up inside of the first and second air/refrigerant heat exchanger, causing a gradual clogging up of the closed-circuit which creates loss of pressure inside the air recirculating conduit.

As a result of the loss of pressure inside the recirculating conduit, the rotation speed of the centrifugal fan and the flow rate of the air flow tend to gradually decrease, causing the drawback that the drying time increases and, consequently, the drying process slows down.

Due to the fact that the rotation speed of the centrifugal fan decreases, the electric motor is subjected to slow down and works under stress causing disadvantageous higher electricity power consumption.

In addition, the air temperature inside the heat pump assembly tends to gradually increase, reaching a high value which may both cause damage to the clothing and several heat dissipation problems at the compressing device of the heat-pump device.

In detail, in that event, the heat-pump device needs to operate at full capacity, but the compressing device may not be able to absorb by means of the evaporator a sufficient amount of heat from the airflow so as to maintain the air temperature in the air recirculating conduit under a safety threshold over which the compressing device is automatically turned off by an auxiliary safety dryer device.

Finally, it should be understood that when the compressing device operates in the full capacity state, it becomes quite noisy and unfortunately its operating life decreases.

SUMMARY OF SELECTED INVENTIVE ASPECTS

It is an aim of the present invention to provide a rotary-drum home laundry drier designed to eliminate the aforementioned drawbacks.

According to an aspect of the present invention, there is provided a home laundry drier as claimed.

According to a further aspect of the present invention, there is provided a laundry drier comprising an outer box casing, a laundry drum which is located in axially rotating manner inside the casing to rotate about an longitudinal axis, and a closed circuit hot-air generator for circulating a stream of hot air inside said laundry drum; said closed circuit hot-air generator comprising:

- an air recirculating conduit connected at both ends to the laundry drum so as to form the closed circuit;
- a centrifugal fan located along said air recirculating conduit to produce, inside the latter, an airflow flowing through the laundry drum;
- heat-pump means comprising first and second air/refrigerant heat exchangers located in the air recirculating conduit to rapidly cool the airflow coming out from the laundry drum for condensing the surplus moisture in said airflow, and, respectively, to heat the airflow returning back into said laundry drum;

the laundry drier further comprising:

- an electric motor which is designed to simultaneously rotate both said centrifugal fan and said laundry drum through transmission system means;

said laundry drier being characterized in comprising electronic control means controlling the speed of the electric motor and a base resting on the floor; said casing being fixed stably, but in easily removable manner, to the base; said heat-pump means being located within said base and wherein the electronic control means comprises a protective outer container; said protective outer container (25) being fixed to the base (2).

Preferably, said protective outer container is fixed to the base by means of a number of supporting brackets.

Preferably, the electronic control means are supported by at least two supporting brackets fixing the bottom side of the outer container to the upper ends of two sidewalls of a motor compartment formed on the base and shaped to house said electric motor.

Preferably, the sidewalls of the motor compartment are faced toward one another and projects from the base in a direction substantially perpendicular to the lying plane of the base and orthogonal to the longitudinal axis; said supporting brackets being designed to support the outer container so that the latter is placed astride the electric motor and beneath the drum.

Preferably, the first sidewall of the motor compartment projects from the base so that it separates the electric motor from the centrifugal fan.

Preferably, a second sidewall of the motor compartment is located on the base spaced-out from, and parallel with said first sidewall, and separates the electric motor from a compressor compartment, which is structured to house an electrically powered refrigerant compressing device.

Preferably, the outer container comprises one or more cooling slots adapted to cool the electronic control means.

Preferably, the electronic control means are coupled/connected with/to a heat sink adapted to cool the electronic components comprised in the electronic control means.

Preferably, the heat sink comprises a base plate of heat-conducting material having a first surface coupled/connected with/to the electronic components comprised in the electronic control means and a number of dispersion plates/wings projecting from a second surface of the base plate to outside of the outer container.

Preferably, the heat sink may be part of the outer container.

Preferably, the electronic control means comprise inverter control means.

BRIEF DESCRIPTION OF THE DRAWINGS

A non-limiting embodiment of the present invention will be described by way of example with reference to the accompanying drawings, in which.

DETAILED DESCRIPTION OF EXAMPLE EMBODIMENTS

Figure 1:
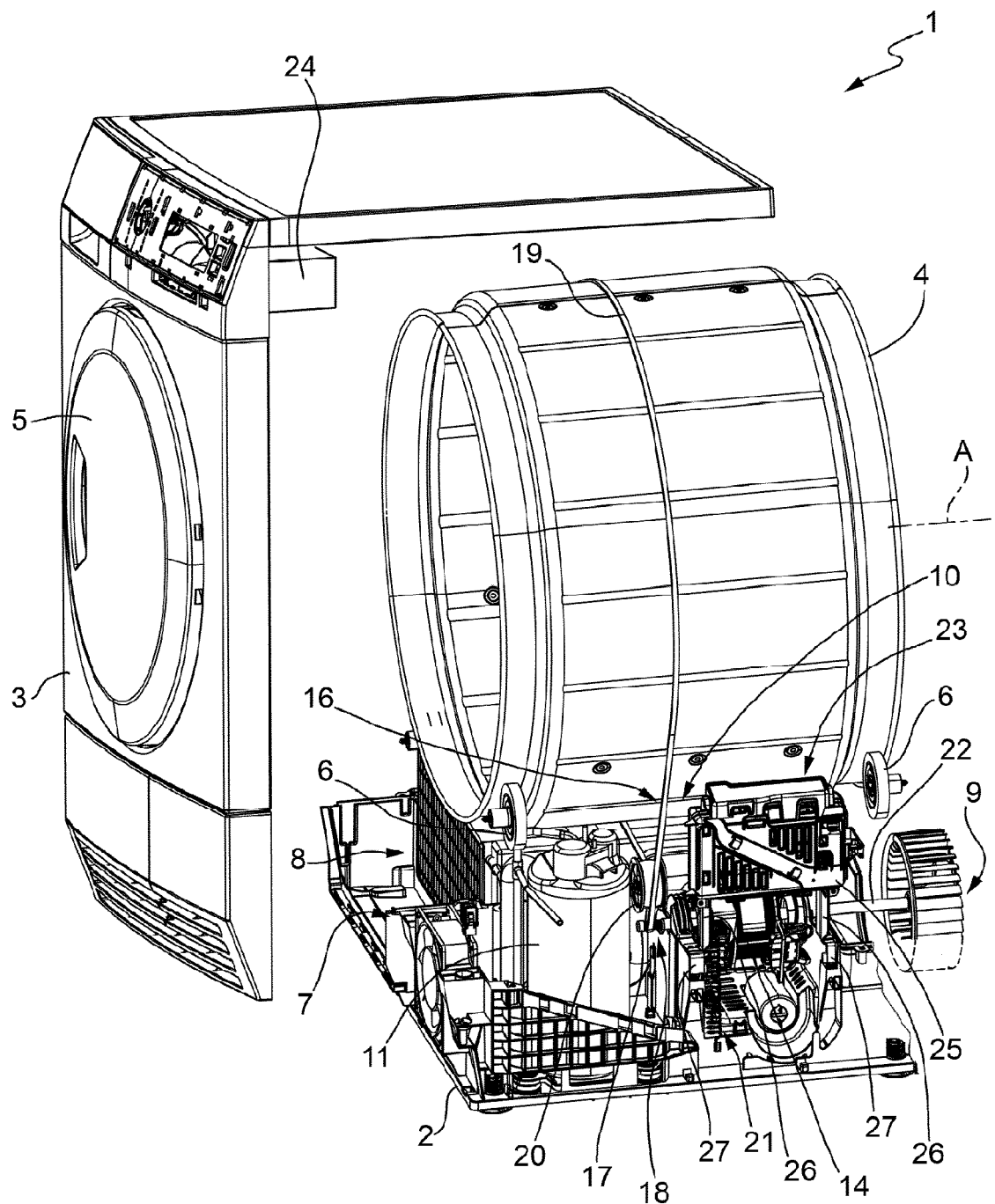
FIG. 1 shows a partly exploded view, with parts removed for clarity, of a home laundry drier in accordance with the teachings of the present invention.

With reference to FIG. 1, number 1 indicates as a whole a home laundry drier comprising a base 2 resting on the floor; a casing 3 designed to be fixed stably, but in easily removable manner, to the base 2, by fixing means; a cylindrical revolving laundry drum 4 for housing the laundry to be dried, and which is fixed in axially rotating manner inside casing 3 above the base 2, directly facing a laundry loading and unloading opening (not shown) formed in the front face of casing 3; and a door 5 hinged to the front face of casing 3 to rotate to and from a rest position closing opening in the front face to seal revolving laundry drum 4.

Preferably, the revolving laundry drum 4 rests horizontally inside casing 3 on a number of horizontal supporting rollers 6 which are fitted to casing 3 to let revolving drum 3 freely rotate about its longitudinal axis A.

Casing 3, revolving laundry drum 4, door 5 and supporting rollers 6 are commonly known parts in the industry, and therefore are not described in detail.

Figure 2:
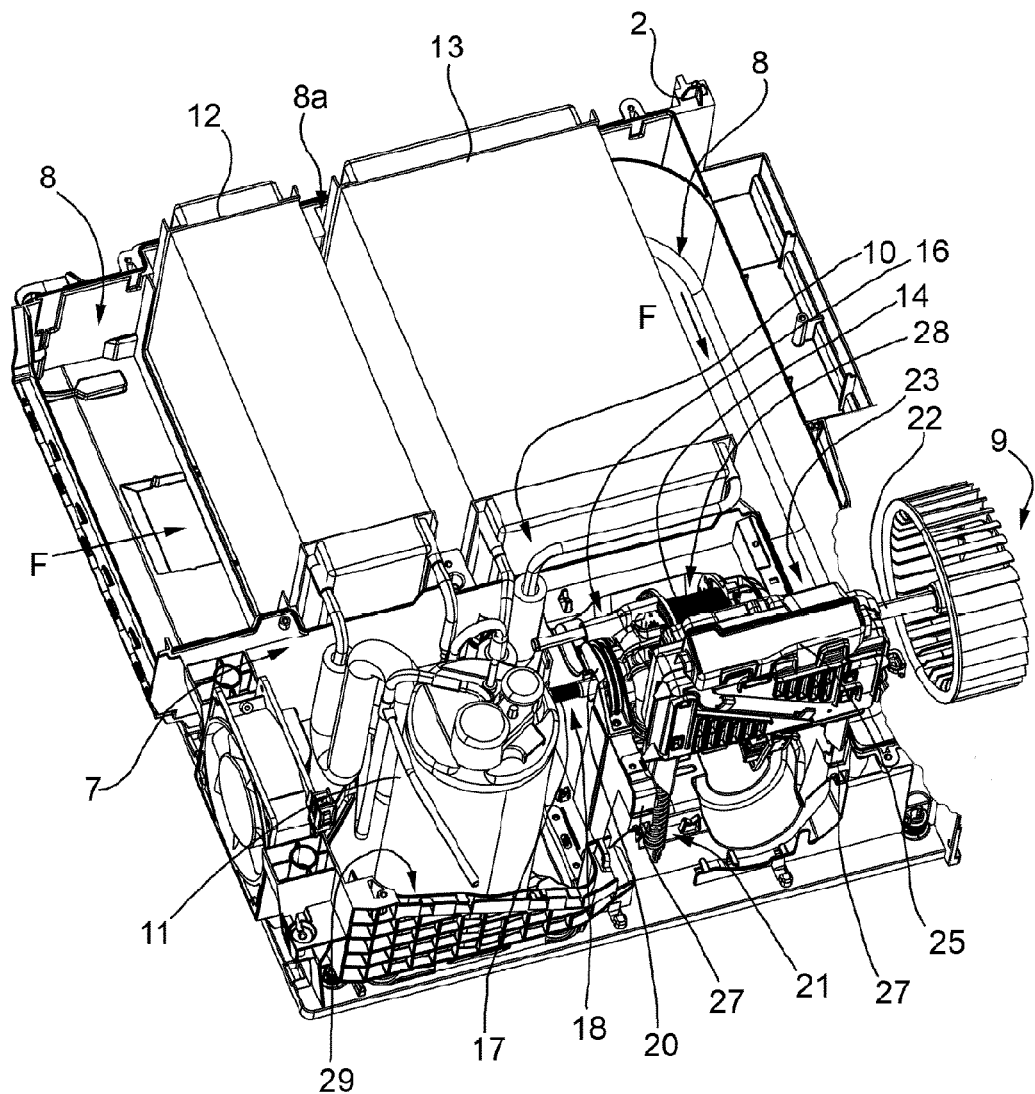
FIG. 2 shows a perspective view, with parts removed for clarity, of a lower part, i.e. a base, containing a hot-air generator of the home laundry drier shown in FIG. 1.

With reference to FIGS. 1 and 2, laundry drier 1 comprises a closed-circuit, hot-air generator 7 housed inside the base 2 and at least partially in the casing 3, and designed to circulate through revolving laundry drum 4 a stream of hot air having a low moisture level, and which flows over and rapidly dries the laundry inside revolving laundry drum 4.

Accordingly, closed-circuit, hot-air generator 7 provides for gradually drawing air from revolving laundry drum 4; extracting surplus moisture from the air drawn from revolving laundry drum 4; heating the dehumidified air to a predetermined temperature, normally higher than the temperature of the air from revolving laundry drum 4; and feeding the heated, dehumidified air back into revolving laundry drum 4, where it flows over, to rapidly dry, the laundry inside the drum.

Referring to FIG. 2, hot-air generator 7 provides for continually dehumidifying and heating the air circulating inside revolving drum 4 to rapidly dry the laundry inside the drum 4, and substantially comprises:

an air recirculating conduit 8 which has a air recirculating chamber 8a inside the base 2, presenting the two opposite ends connected to the revolving laundry drum 4 on opposite sides of the latter;

a centrifugal fan 9 located along recirculating conduit 8 inside the base 2 to produce, inside recirculating conduit 8, an airflow F which flows into revolving drum 4 and over the laundry inside drum 4; and a heat-pump device 10 which is located inside the base 2 and is able to rapidly cool the airflow F coming out from revolving laundry drum 4 for condensing the surplus moisture in the airflow F, and then to rapidly heat the airflow F returning back into revolving laundry drum 4, so that the airflow entering into revolving drum 4 is heated rapidly to a temperature higher than or equal to that of the same air flowing out of the drum 4.

Referring to FIG. 2, heat-pump device 10 is able to transfer heat from one fluid to another using an intermediate gaseous refrigerant subjected to a closed thermodynamic cycle, the thermodynamic principles of which are widely known and therefore not described in detail.

Accordingly, heat-pump device 10 comprises an electrically powered refrigerant compressing device 11, which subjects a gaseous refrigerant to compression (e.g. adiabatic compression) so that refrigerant pressure and temperature are much higher at the outlet than at the inlet of compressing device 11.

Heat-pump device 10 further comprises a first air/refrigerant heat exchanger 12, i.e. an evaporator, which is located on the inside of the recirculating chamber 8a, and is designed so that the airflow F coming out from revolving drum 4 and the refrigerant flowing to the inlet of compressing device 11 flow through it simultaneously, allowing the refrigerant having a temperature lower than that of the airflow F, to absorb heat from the airflow F thus causing condensation of the surplus moisture in the airflow F.

Heat-pump device 10 further comprises a second air/refrigerant heat exchanger 13, i.e. condenser, which is located on the inside of the recirculating chamber 8a, downstream of the first air/refrigerant heat exchanger 12 and upstream of the centrifugal fan 9, and is designed so that the airflow F directed to revolving drum 4 and the refrigerant from the outlet of compressing device 11 flow through it simultaneously, allowing the refrigerant having a temperature greater than that of the airflow F to release heat to the airflow F, thus rapidly heating the airflow f to a temperature higher than of the airflow F coming out of the first air/refrigerant heat exchanger 12, and preferably, though not necessarily, also higher or equal to the temperature of the airflow F coming out of revolving drum 3.

Referring to FIG. 2, heat-pump device 10 further comprises a throttling valve or similar refrigerant expansion devices (not shown), which subjects the refrigerant flowing from the second air/refrigerant heat exchanger 13 to the first air/refrigerant heat exchanger 12 to a rapid expansion, so that pressure and temperature of the refrigerant entering in the first air/refrigerant heat exchanger 12 are much lower than pressure and temperature of the refrigerant coming out from second air/refrigerant heat exchanger 13, thus completing the closed thermodynamic cycle in opposition to the compressing device 11, which provides for rapidly compressing the refrigerant.

Heat-pump device 10 finally comprises a number of suitable connecting pipes which connect refrigerant compressing device 11, first heat exchanger 12, second heat exchanger 13 and refrigerant expansion device one to the other, so as to form a closed circuit allowing the refrigerant coming out from the outlet of compressing device 11 to flow, in sequence, through second heat exchanger 13, refrigerant expansion device and first heat exchanger 12, before returning to the inlet of compressing device 11.

Referring to FIGS. 1 and 2, home laundry drier also comprises an electric motor 14, which drives both the centrifugal fan 9 and a transmission system 16 that rotates the revolving laundry drum 4 around the longitudinal axis A.

Accordingly, the electric motor 14 has a first shaft 17 whose distal end 18 is pulley-shaped and forms part of the transmission system 16 for rotating the revolving laundry drum 4.

The transmission system 16 further comprises an endless belt 19 which passes around the outer periphery of revolving laundry drum 4 and around the distal end of the first shaft 17. The distal end is designed to drive the belt 19 around the drum 4. In order to maintain the belt 19 in tension or friction against the outer surface periphery of drum 4, an idler pulley 20 is held in tension against the belt 19 by means of a cantilevered spring device 21.

Referring to FIGS. 1 and 2, the electric motor 14 also comprises a second shaft 22 which extend from the frame of the electric motor 14 to the opposite side of the first shaft 17 and is directly connected to a center hub of the centrifugal fan 9 so as to rotate the latter around a rotational axis, together with the rotation of endless belt 19 of the revolving drum 4.

Preferably, the electric motor 14 comprises a three-phase electric motor, i.e. an induction or permanent-magnet electric motor, such as brushless AC motor.

The rotation speed of the electric motor 14 which rotates both the drum 4 and the centrifugal fan 9 is controlled by an electronic control apparatus such as an inverter control device 23, which, preferably, receives an input reference speed from a main electronic control unit 24 on the basis of the drying cycle selected by the user.

Accordingly, any drying cycle selectable by the user may comprise one or more reference speeds, each of which is associated with a nominal airflow rate within the air recirculating conduit 8 and to a nominal revolving drum speed.

In a preferred embodiment of the present invention, inverter control device 23 is configured to:
  receive a reference speed from the main electronic control unit 24 associated with the nominal airflow rate and the nominal revolving drum speed which the drying program provides for, and
  control the electric motor 14 so that the output motor speed is maintained substantially equal to the reference speed, independently of decreasing of the airflow rate F inside the air recirculating conduit 8 compared to the nominal airflow rate, and caused by clogging-up of particles within the first air/refrigerant heat exchanger 12 and/or the second air/refrigerant heat exchanger 13.

In a preferred embodiment, the electrical architecture of inverter control device 23 may comprise an interface circuit (not shown) for receiving, filtering, and conditioning reference speed from the main electronic control unit 24; a control circuit connected to interface circuit to receive reference speed and generate control signals accordingly; and a power circuit, which receives the control signals and accordingly regulates current/voltage supply to electric motor 14 so that the output speed of the electric motor is substantially equal to the received reference speed.

Preferably, inverter control device 23 may comprise, for example, a first and a second power line (not shown) at a substantially continuous supply voltage; the electric power circuit (not shown) may comprise a number of transistors, i.e. six transistors located in pairs along three control circuit branches connected to the first and second power line, and each having, between the relative pair of transistors, a node connected to a input terminal of the electric motor 14; current-measuring modules (not shown) able to instantaneously measure the supply current along a power line or circuit branches; and a open-loop module (not shown) which is configured to receive the supply voltage and the reference speed associated to a selected drying program, and supply control signals for controlling transistors and each comprising a given duty cycle enabling/disabling a respective transistor of the power circuit so that the output motor speed is maintained substantially equal to the reference speed.

It should be pointed out that controlling the electric motor 14 by the inverter control device 23 based on the reference speed (associated with the nominal airflow rate and the nominal revolving drum speed), allows to obtain an output motor speed which is substantially stable and constant, substantially equal, or nearly equal, to the reference speed, and eliminates (or at least greatly reduces) drying time/temperature increase caused by clogging-up of particles within the first/second air/refrigerant heat exchanger 12, 13.

In a preferred embodiment shown in FIG. 2, inverter control device 23 substantially comprises a protective outer container 25; and an inverter electronic circuit (not shown), which is conveniently defined by a electronic board housed inside the container 25 and electrically connected to both main electronic control unit 24, to receive reference speed, and to the input terminals of the electric motor 14 so as to supply to the latter the controlled current/voltage.

Preferably, protective outer container 25 comprises a box made in plastic or any other kind of similar material, has a parallelepiped external shape and is permanently fixed to the base 2 by means of a number of supporting brackets 26.

In a preferred embodiment, outer container 25 of the inverter control device 23 is supported by at least two supporting brackets 26 fixing the bottom side of the outer container 25 to the upper ends of two sidewalls 27 of a compartment 28 formed on the base 2 and shaped to house the electric motor 14.

In a preferred embodiment, the box of the outer container 25 may present one or more cooling slots (not shown) designed to cool the inner electronic circuit. Preferably, the inner electronic circuit may be coupled/connected with/to a heat sink (not shown) designed to cool the electronic components comprised in the electronic circuit.

In a preferred embodiment, the heat sink comprises a base plate (not shown) of heat-conducting material, e.g. aluminum, presenting a first surface coupled/connected with/to the inner electronic circuit and a number of dispersion plates/wings projecting from the second surface of base plate to outside of the box.

In a preferred embodiment, heat sink may be part of the outer container 25. For example, heat sink may be integrated into a wall of the box so that the dispersion plates/wings project to the out side of the box.

In a possible embodiment box of the outer container 25 have a slot which is closed by the base plate of the heat sink.

In a different embodiment, inverter control device 23 above disclosed is replaced by an electronic control unit (not shown) which is configured to regulate the speed of the electric motor based on the input reference speed from a main electronic control unit 24. In should be pointed out that in this case electronic control unit is housed inside the protective container 25 and electrically connected to both main electronic control unit 24, to receive reference speed, and to the input terminals of the electric motor 14 so as to supply to the latter the controlled current/voltage on the basis of a specific speed control algorithm. For example, the specific speed control algorithm, when implemented by the electronic control unit, may control the motor to vary the output motor speed.

Referring to FIG. 2, sidewalls 27 of the compartment 28 are faced toward one another and project from the base 2 in a direction substantially perpendicular to the lying plane of the base 2 and orthogonal to the longitudinal axis A; whereas two supporting brackets 26 support the outer container 25 so that the later is placed astride the electric motor 14 and beneath the drum 4.

Accordingly, a first sidewall 27 projects from the base 2 so that it separates the electric motor 14 from the centrifugal fan 9 and present its upper end shaped to house an intermediate portion of the second shaft 22; whereas the second sidewall 27 is located on the base 2 spaced-out from, and parallel with, the first sidewall 27, and is shaped to house an intermediate portion of the first shaft 17.

According to a preferred embodiment, the second sidewall 27 separates the electric motor 14 from a compressor compartment 29, which is structured to house the electrically powered refrigerant compressing device 11.

Figure 3:
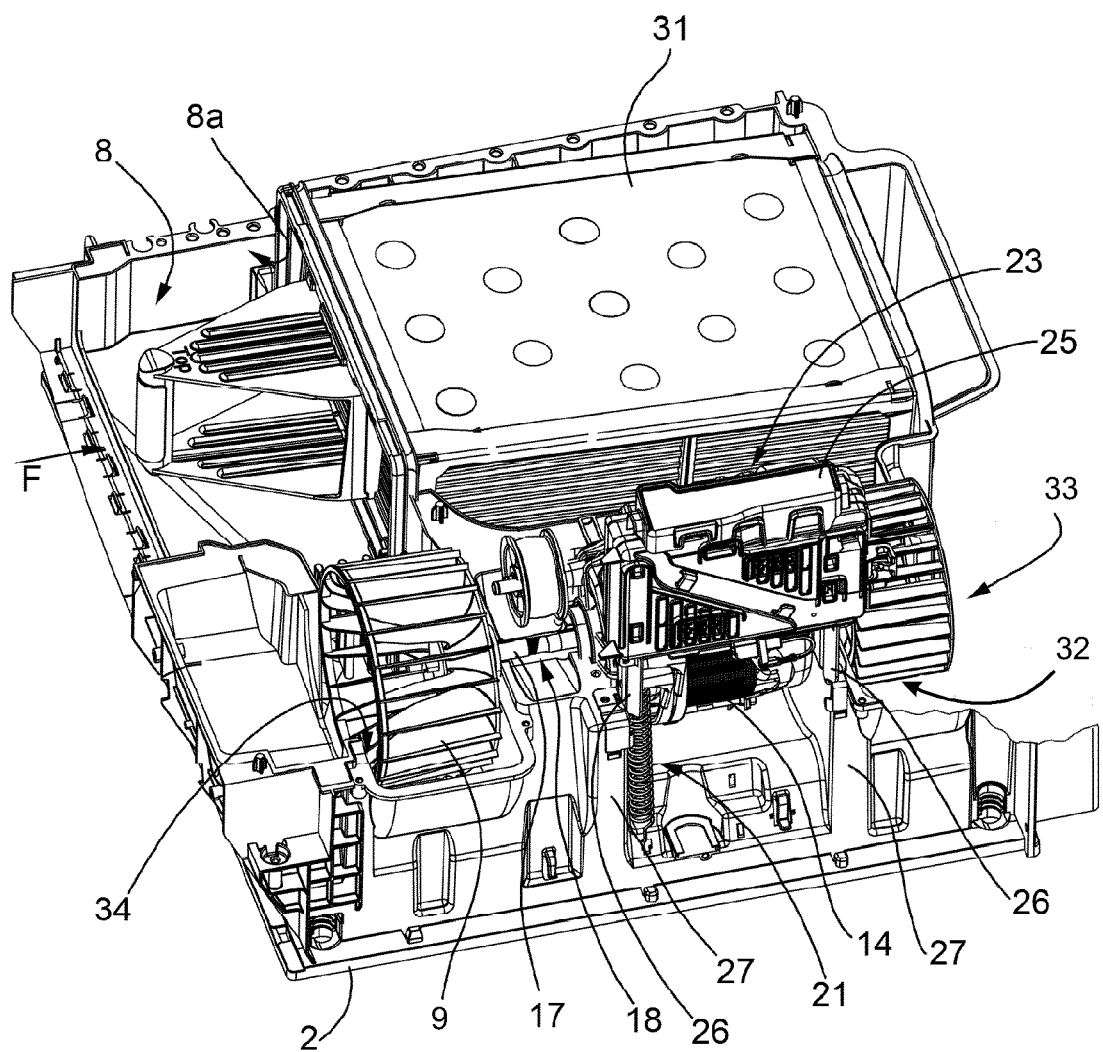
FIG. 3 shows a perspective view, with parts removed for clarity, of a lower part, i.e. the base, containing a hot-air generator of the home laundry drier according to a different embodiment of the present invention.

It should be pointed out that according to another embodiment the inverter control device 23 may be supported by means of supporting brackets 26 fixing the bottom side of the outer container 25 with two sidewalls 27 of a motor compartment 28 formed into a base designed to contains an air/air heat exchanger 30 as shown in FIG. 3.

Referring to FIG. 3, a hot-air generator essentially comprises a cool condenser module 31 located on the inside of the recirculating chamber 8a; a cooling open circuit 32 which has a portion that cross through the cool condenser module 31, and a cooling fan 33 located along the cooling open circuit 32 to cool condenser module 31 so as to condense the moisture in the hot air flowing through it.

Accordingly the process fan 9 is located into a fan compartment 34 formed on the base 2 and is shrunk-on the end of the first shaft 17.

The electric motor 14 drives both the process fan 9 and the cooling fan 33

The advantages of drier 1 as described include: controlling the electric motor by the inverter control circuit, the rotation speed of the centrifugal fan and the flow rate of the air flow are maintained stable during the drying cycle. Therefore drying time does not increase and the electric motor does not work under stress.

In addition, clothing is not subject to being damaged because the air temperature inside the heat pump assembly does not increase over a critical threshold.

The invention claimed is:

1. A laundry drier comprising an outer box casing, a laundry drum which is located in axially rotating manner inside the casing to rotate about an longitudinal axis, and a closed circuit hot-air generator for circulating a stream of hot air inside said laundry drum; said closed circuit hot-air generator comprising:
   an air recirculating conduit connected at both ends to laundry drum so that to form the closed circuit;
   a centrifugal fan located along said air recirculating conduit to produce, inside the latter, an airflow flowing through the laundry drum;
   heat-pump means comprising a first and second air/refrigerant heat exchangers located into the air recirculating conduit to rapidly cool the airflow coming out from the laundry drum for condensing the surplus moisture in said airflow, and, respectively, to heat the airflow returning back into said laundry drum;
   the laundry drier further comprising:
   an electric motor which is designed to simultaneously rotate both said centrifugal fan and said laundry drum through transmission system means;
   said laundry drier further comprising electronic control means for controlling the speed of the electric motor and configured to:
   receive a predetermined speed which is associated with a nominal airflow rate within the air recirculating conduit and to a nominal drum speed; said nominal airflow rate and nominal drum speed being both related to a drying program selected by a user; and
   control the electric motor so that the output motor speed is maintained substantially equal to said predetermined speed, independently of decreasing of the airflow rate caused by clogging-up of particles within said first and/or second air/refrigerant heat exchangers of the said heat-pump means.

2. A laundry drier according to claim 1, further comprising a base resting on the floor; said casing being fixed stably, but in easily removable manner, to the base; said heat-pump means being located within said base.

3. A laundry drier according to claim 2, wherein said electronic control means comprises a protective outer container; said protective outer container being fixed to the base.

4. A laundry drier according to claim 3, wherein said protective outer container is fixed to the base by means of a number of supporting brackets.

5. A laundry drier according to claim 4, wherein the electronic control means are supported by at least two supporting brackets fixing the bottom side of the outer container to the upper ends of two sidewalls of a motor compartment formed on the base and shaped to house said electric motor.

6. A laundry drier according to claim 5, wherein sidewalls of the motor compartment are faced toward one another and projects from the base in a direction substantially perpendicular to the lying plane of the base and orthogonal to said longitudinal axis; said supporting brackets being designed to support the outer container so that the latter is placed astride the electric motor and beneath the drum.

7. A laundry drier according to claim 6, wherein a first sidewall of the motor compartment projects from the base so that it separates the electric motor from the centrifugal fan.

8. A laundry drier according to claim 7, wherein a second sidewall of the motor compartment is located on the base spaced-out from, and parallel with said first sidewall, and separates the electric motor from a compressor compartment, which is structured to house an electrically powered refrigerant compressing device.

9. A laundry drier according to claim 3, wherein the outer container comprises one or more cooling slots adapted to cool the electronic control means.

10. A laundry drier according to claim 1, wherein the electronic control means are coupled/connected with/to a heat sink adapted to cool electronic components of the electronic control means.

11. A laundry drier according to claim 10, wherein the heat sink comprises a base plate of heat-conducting material having a first surface coupled/connected with/to said electronic components of the electronic control means and a number of dispersion plates/wings projecting from a second surface of the base plate to outside of the outer container.

12. A laundry drier according to claim 10, wherein the heat sink is part of the outer container.

13. A laundry drier according to claim 1, wherein electronic control means comprise inverter control means.

14. A laundry drier according to claim 3, wherein the electronic control means are coupled/connected with/to a heat sink adapted to cool electronic components of the electronic control means.

15. A laundry drier according to claim 9, wherein the electronic control means are coupled/connected with/to a heat sink adapted to cool electronic components of the electronic control means.

16. A laundry drier according to claim 11, wherein the heat sink is part of the outer container.

17. A laundry drier according to claim 3, wherein the electronic control means comprises inverter control means.

18. A laundry drier according to claim 9, wherein the electronic control means comprises inverter control means.

19. A laundry drier according to claim 10, wherein the electronic control means comprises inverter control means.

20. A laundry drier according to claim 11, wherein the electronic control means comprises inverter control means.

* * * * *